(No Model.)
W. F. KELLETT.
NOSE BAG.
No. 589,899. Patented Sept. 14, 1897.
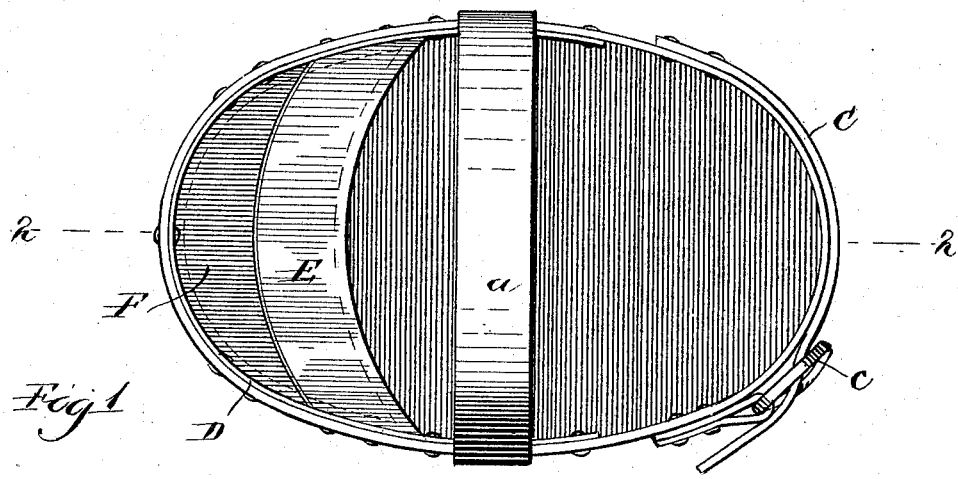
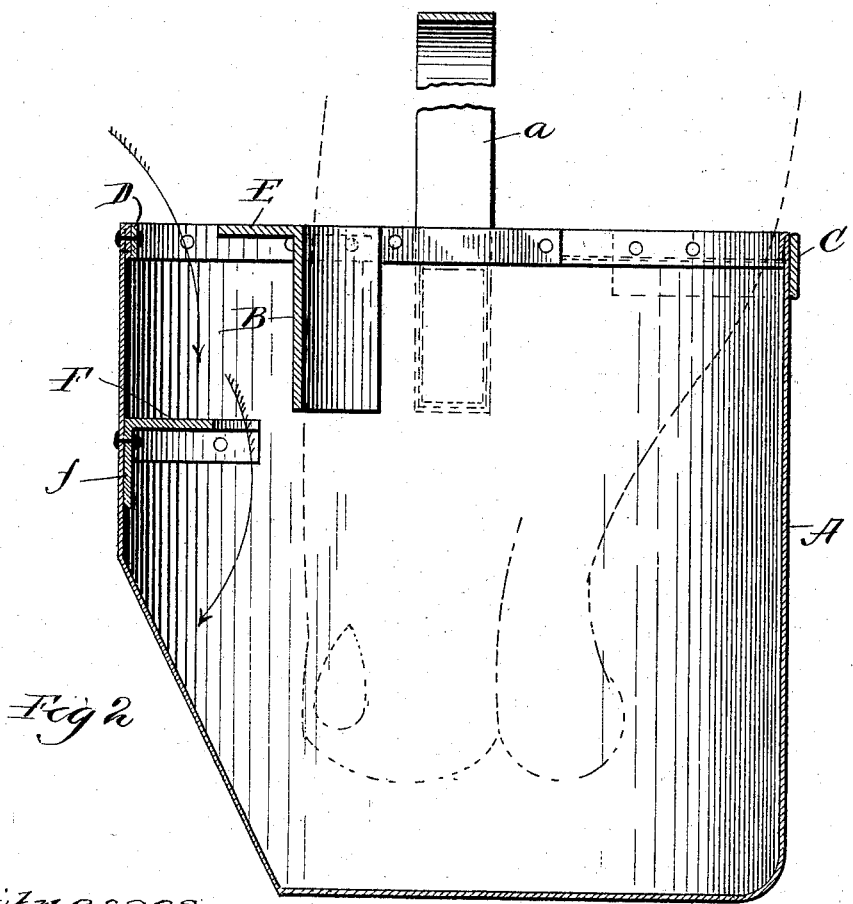
Witnesses
W. C. Corlies
C. H. Crawford
Inventor
William F. Kellett
By Louis K. Gillson
Att'y

UNITED STATES PATENT OFFICE.

WILLIAM F. KELLETT, OF CHICAGO, ILLINOIS.

NOSE-BAG.

SPECIFICATION forming part of Letters Patent No. 589,899, dated September 14, 1897.

Application filed February 17, 1897. Serial No. 623,909. (No model.)

*To all whom it may concern:*

Be it known that I, WILLIAM F. KELLETT, a citizen of the United States, residing at Chicago, in the county of Cook and State of Illinois, have invented certain new and useful Improvements in Nose-Bags; and I do declare the following to be a full, clear, and exact description of the invention, such as will enable others skilled in the art to which it appertains to make and use the same, reference being had to the accompanying drawings, and to the letters of reference marked thereon, which form a part of this specification.

In the drawings, Figure 1 is a plan view of the nose-bag; and Fig. 2 is a vertical central section on the line 2 2 of Fig. 1, the position of the horse's head with reference to the bag being indicated in dotted lines.

The object of the invention is to provide for ample ventilation of the nose-bag while effectually preventing the loss of feed by the tossing of the animal's head.

The invention consists in so constructing the bag that it fits tightly to the throat or under jaw of the animal while projecting forwardly from his face and providing it with a pair of flanges setting part way across the space between the animal's face and the front side of the bag, the one extending forwardly from the nose-strap and the other backwardly from the front of the bag itself, whereby a trap is formed to prevent the discharge of feed.

The bag A is in the form of a simple pouch and is usually made of canvas and is provided with a flexible bail or head-strap $a$, by which it may be sustained from the top of the horse's head. A face-band B extends from side to side of the bag at its top, and at the back of the bag there is a strap C, secured at one side and extending across the throat portion and coöperating with the buckle $c$, secured at the opposite side of the bag, and by means of this strap and buckle the band B may be drawn tightly against the horse's face and the back of the bag gathered snugly around his jaws. A metal band D, preferably of steel, is riveted to the upper edge of the bag across its front portion, so as to hold it open and away from the animal's face, so as to provide for the free circulation of air.

A plate E extends across the top of the bag, projecting forwardly from the band B, but falling considerably short of the front of the bag when in its open position. A plate F extends across the bag farther down, as shown, approximately half-way to the bottom, and projects inwardly from its front wall, but falls considerably short of contact with the horse's face. The plates E and F are preferably of leather, and, as shown, the former is integral with the band B, and the latter has a downwardly-turned flange $f$, by which it is secured to the fabric of the bag by any suitable means, such as rivets, as shown.

Should the animal toss his head, feed cannot escape from the rearward portion of the bag, and such as may be tossed upwardly will be stopped by the plate F, or, should it escape that plate, then by the plate E, and as the head is lowered the feed will drop back to the bottom of the bag.

I claim as my invention—

1. The combination with the bag A, of the face-band crossing the top of the bag, the means for contracting the bag at the back, the plate E and the plate F, constructed and arranged substantially as shown and described.

2. The combination with the bag A, of the face-band crossing the top of the bag, the means for contracting the back of the bag, the distending-band D, the plate E and the plate F, constructed and arranged substantially as shown and described.

3. The combination with a nose-bag adapted to fit closely to the under jaw of an animal and to project forwardly from the animal's face, of a pair of plates radially disposed with reference to the bag and crossing its forwardly-projecting portion, one of the plates extending backwardly from the front wall of the bag, and the other plate being spaced apart therefrom, and being adapted to abut against the animal's face.

In testimony whereof I affix my signature in presence of two witnesses.

WILLIAM F. KELLETT.

Witnesses:
LOUIS K. GILLSON,
HESTER BAIRD.